United States Patent
Alvig et al.

(10) Patent No.: US 10,268,932 B2
(45) Date of Patent: Apr. 23, 2019

(54) MODULAR PRINT ENGINES AND MODULAR PRINT ENGINE COMPONENTS

(71) Applicant: Entrust Datacard Corporation, Shakopee, MN (US)

(72) Inventors: David Alvig, Shakopee, MN (US); Arthur Joseph Paulson, Shakopee, MN (US); Patrick C. Cronin, Shakopee, MN (US); Mark James Sobania, Shakopee, MN (US)

(73) Assignee: Entrust Datacard Corporation, Shakopee, MN (US)

( * ) Notice: Subject to any disclaimer, the term of this patent is extended or adjusted under 35 U.S.C. 154(b) by 0 days.

(21) Appl. No.: 15/872,395

(22) Filed: Jan. 16, 2018

(65) Prior Publication Data

US 2018/0144217 A1 May 24, 2018

Related U.S. Application Data (63) Continuation of application No. 15/094,462, filed on Apr. 8, 2016, now Pat. No. 9,904,876.
(Continued)

(51) Int. Cl.
*B41J 13/12* (2006.01)
*G06K 15/02* (2006.01)

(52) U.S. Cl.
CPC ............ *G06K 15/021* (2013.01); *B41J 13/12* (2013.01)

(58) Field of Classification Search
CPC ..... B41J 2/325; B41J 2/32; B41J 2/315; B41J 2/442; B41J 3/00; B41J 13/12;
(Continued)

(56) References Cited

U.S. PATENT DOCUMENTS

| 5,941,522 A | 8/1999 | Hagstrom et al. |
| 5,959,278 A | 9/1999 | Kobayashi et al. |

(Continued)

FOREIGN PATENT DOCUMENTS

| CN | 1245115 A | 2/2000 |
| CN | 1255093 A | 5/2000 |

(Continued)

OTHER PUBLICATIONS

International Search Report and Written Opinion of International Application No. PCT/US2016/026609, dated Jul. 20, 2016, 13 pages.
(Continued)

*Primary Examiner* — Kristal Feggins
(74) *Attorney, Agent, or Firm* — Hamre, Schumann, Mueller & Larson, P.C.

(57) ABSTRACT

Modular print engines and print engine components that are usable in desktop card printers for personalizing plastic cards such as financial cards including credit and debit cards, identification cards, driver's licenses, and other personalized plastic cards. The modular nature of the print engines and print engine components permit alteration in the specific functionality of the desktop card printers depending upon, for example, the personalization requirements of the plastic cards and intended applications of the desktop card printers. In addition, the modular print engine components can be completely tested prior to installation into the modular print engines to ensure that the modular print engine components are working correctly prior to installation. Furthermore, the modular print engine components add flexibility to the desktop card printers as upgraded functionality and features can be introduced by developing new modular components.

17 Claims, 8 Drawing Sheets

Related U.S. Application Data (60) Provisional application No. 62/145,284, filed on Apr. 9, 2015.

(58) Field of Classification Search
CPC .............. B41F 16/0033; B41F 16/0006; B41F 16/0026; B41F 16/00; G06K 15/021
See application file for complete search history.

(56) References Cited

U.S. PATENT DOCUMENTS

| | | | |
|---|---|---|---|
| 6,894,710 | B2 | 5/2005 | Suzuki et al. |
| 7,398,972 | B2 | 7/2008 | Schuller et al. |
| 8,721,205 | B2 | 5/2014 | Francis et al. |
| 8,820,743 | B2 | 9/2014 | Takei et al. |
| 2008/0089730 | A1 | 4/2008 | Bryant et al. |
| 2012/0286464 | A1 | 11/2012 | Takei et al. |
| 2013/0125383 | A1 | 5/2013 | Bielesch et al. |
| 2013/0220984 | A1 | 8/2013 | Cronin et al. |
| 2014/0345787 | A1 | 11/2014 | Zaborowski et al. |

FOREIGN PATENT DOCUMENTS

| | | |
|---|---|---|
| CN | 1750022 A | 3/2006 |
| CN | 102686404 A | 9/2012 |
| EP | 0983148 B1 | 12/2003 |
| JP | H11268457 A | 10/1999 |
| JP | 2011131952 A | 7/2011 |
| WO | 03089251 A1 | 10/2003 |
| WO | 2006083521 A2 | 8/2006 |

OTHER PUBLICATIONS

The extended European search report issued in EP16777340.7 dated Mar. 28, 2018, 8 pages.

Office Action issued in corresponding Chinese application No. 201680016290.6, dated Jan. 29, 2019, with English translation, 19 pages provded.

MODULAR PRINT ENGINES AND MODULAR PRINT ENGINE COMPONENTS

FIELD

This disclosure describes modular print engines and modular print engine components that can be used with the modular print engines to personalize plastic cards such as financial cards including credit and debit cards, identification cards, driver's licenses, and other personalized plastic cards.

BACKGROUND

Plastic cards such as financial cards including credit and debit cards, identification cards, driver's licenses, and other personalized plastic cards are typically personalized with personal information of the intended card holder. Examples of personalization include, but are not limited to, names, addresses, photographs, account numbers, employee numbers, or the like. The personal information may be applied to the card in a number of different ways including, but not limited to, printing on a surface of the document, storing the information on a magnetic stripe disposed on the card, and storing the information on an integrated circuit chip or smart chip embedded in the card.

In some cases, the plastic cards are personalized using a desktop card printer that has a relatively small footprint intended to permit the desktop card printer to reside on a desktop and that is designed to personalize cards in relatively small volumes, for example measured in tens or low hundreds per hour. An example of a desktop printer is the CD800 Card Printer available from Entrust Datacard Corporation of Shakopee, Minn.

Desktop card printers are typically designed to be relatively small so that the printers can fit onto a desk or table. The desktop card printer may be positioned on a support surface with other office machines and workspace, so that table and desk space is at a premium. Therefore, the amount of desk or table space required for the desktop card printer (i.e., its "footprint") should be minimized.

At the same time, it is desirable that a desktop card printer be able to perform multiple card processing operations, thereby increasing the performance capability of the desktop card printer.

Additionally, desktop card printers should be easy to operate and maintain with only a minimal amount of specialized training. Desktop card printers are often operated by personnel for whom producing cards is only an incidental portion of their job, such as a security guard or a desk clerk, and not by personnel who have special training in such equipment. The operation and maintenance of the card printer should thus be relatively intuitive and straightforward. Furthermore, the cards that are output from the card printer must be of the highest quality, attractive, and durable.

SUMMARY

Modular print engines and modular print engine components useable with the modular print engines are described. The modular print engines and print engine components are usable in desktop card printers for personalizing, for example, plastic cards such as financial cards including credit and debit cards, identification cards, driver's licenses, and other personalized plastic cards. The modular nature of the print engines and print engine components described herein permit alteration in the specific functionality of the desktop card printers depending upon, for example, the personalization requirements of the plastic cards and intended applications of the desktop card printers. In addition, the modular print engine components can be completely tested prior to installation into the modular print engines to ensure that the modular print engine components are working correctly prior to installation. Furthermore, the modular print engine components add flexibility to the desktop card printers as upgraded functionality and features can be introduced by developing new modular components.

In one embodiment, the modular print engine can be removably mounted on top of a lower module that performs one or more card processing operations including, but not limited to, embossing, laminating, or both embossing and laminating. The functionality of the desktop card printer can be selectively altered by installing different ones of the modular print engine components into and/or onto the module print engine. Before or after printing in the modular print engine, a plastic card can be directed from the modular print engine into the lower module to perform the processing operation(s) of the lower module. Thereafter, the plastic card can be output from the lower module or directed back into the modular print engine for further processing and/or output of the personalized card.

The modular print engine can include a card input at a front end of a housing, as well as a card input hopper which is in communication with the card input to input cards into the modular print engine for personalization. A card reorienting mechanism is in the housing adjacent to a rear end thereof, and the card reorienting mechanism is configured to receive a plastic card and rotate the card to redirect the card along a desired card travel path in the housing. A first card travel path extends between the card input and the card reorienting mechanism with cards being transported along the first card travel path by a card transport mechanism. A print engine that is configured to print on a card is disposed along the first card travel path. The print engine can perform any type of printing including, but not limited to, retransfer printing, direct to card printing, ink jet printing, laser marking, laser engraving, and any other type of printing performed on cards.

The modular print engine also includes a second card travel path extending from the card reorienting mechanism. A removable option module is disposed along the second card travel path. The removable option module includes at least one personalization mechanism that is configured to perform a personalization operation on a card. The removable option module can be removed and replaced with a different option module that is configured to have a different functionality. A plurality of different option modules, each having different functionality, can be created. Each option module is configured to be individually and separately removably installed in the housing along the second card travel path, and each option module is configured to perform a different personalization operation on a plastic card received thereby. One option module can be removed and replaced with a different option module to change the functionality of the modular print engine.

The modular print engine includes a first card opening in the bottom of the housing. A third card travel path extends from the card reorienting mechanism to the first card opening to permit a card to be output from the modular print engine and into the lower module. In some embodiments, after processing in the lower module, the plastic card can be input back into the modular print engine through the first card opening for further processing and/or output from the modular print engine.

In one embodiment, a second card opening can be provided in the rear end of the housing, and a fourth card travel path extends from the card reorienting mechanism to the second card opening. In this embodiment, a second option module can be attached to the rear end of the housing for receiving a card from the second card opening. The second option module can include at least one processing mechanism that is configured to perform a processing operation on a card.

In another embodiment, a second card opening can be provided in the top of the housing, and the second card travel path extends from the card reorienting mechanism to the second card opening. An upper expansion module can be attached to the top of the housing and can receive a plastic card from the modular print engine through the second card opening, with the card then being directed to an output of the upper expansion module through which the plastic card can be output from the upper expansion module.

In one embodiment, a modular print engine useable in a desktop card printer that personalizes cards includes a housing having a front end, a rear end, a top and a bottom. A card input is at the front end of the housing, and a card input hopper is disposed at the front end of the housing that is in communication with the card input. A card reorienting mechanism is disposed in the housing adjacent to the rear end, with the card reorienting mechanism being configured to receive a card and rotate the card to redirect the card along a desired card travel path. A first card travel path extends between the card input and the card reorienting mechanism. In addition, a second card travel path extends from the card reorienting mechanism. A print engine that is configured to print on a card is disposed along either the first card travel path or the second card travel path, and a removable option module is disposed along either the first card travel path or the second card travel path. The removable option module includes at least one personalization mechanism that is configured to perform a personalization operation on a card. In addition, a first card opening is formed in the bottom of the housing, and a third card travel path extends from the card reorienting mechanism to the first card opening.

In another embodiment, a desktop card printer system that personalizes cards includes a housing having a front end, a rear end, a top and a bottom. A card input is at the front end of the housing, and a card input hopper is in communication with the card input. A card reorienting mechanism is disposed in the housing adjacent to the rear end, with the card reorienting mechanism being configured to receive a card and rotate the card to redirect the card along a desired card travel path. A first card travel path extends between the card input and the card reorienting mechanism. In addition, a second card travel path extends from the card reorienting mechanism. A print engine that is configured to print on a card is disposed along either the first card travel path or the second card travel path. The system also includes a plurality of option modules, where a single one of the option modules is configured to be removably installed in the housing along either the first card travel path or the second card travel path. Each option module is configured to perform a different personalization operation on a plastic card received thereby. Therefore, by changing the option module that is installed, the functionality of the desktop card printer can be changed.

As used herein, a processing mechanism is intended to encompass a mechanism that performs a processing operation on a card that can involve personalization or not involve personalization. For example, applying a transparent protective laminate, perhaps even including a hologram or other non-personalized security feature, is an example of a card processing operation that does not involve personalization. Applying a name, address, photograph, account number, employee number, signature, or the like to a card are examples of processing operations that involve personalization. A personalization mechanism is intended to encompass a mechanism that performs a processing operation on a card that involves personalization. The term processing operation therefore encompasses both personalization and non-personalization operations performed on a card, while the term personalization operation encompasses personalization operations performed on a card.

DETAILED DESCRIPTION

As described further below, in some embodiments, a modular print engine 10 can include a card reorienting mechanism that is disposed at the intersection of four distinct card travel paths. In one embodiment, the four card travel paths are located at 90 degree intervals around the card reorienting mechanism and the card travels paths extend either horizontally or vertically. However, the four card travel paths can be positioned at other spaced intervals about the card reorienting mechanism, and the card travel paths need not extend horizontally or vertically.

In addition, the modular print engine 10 described further below can include a card input at a front end thereof and a card opening through a rear end thereof. In some embodiments, there can also be a card opening through a bottom of the modular print engine 10. In other embodiments, there can also be a card opening through a top of the modular print engine. Depending upon the desired card travel path through the desktop card printer, the card openings can be card inputs or both inputs and outputs.

Figure 1:
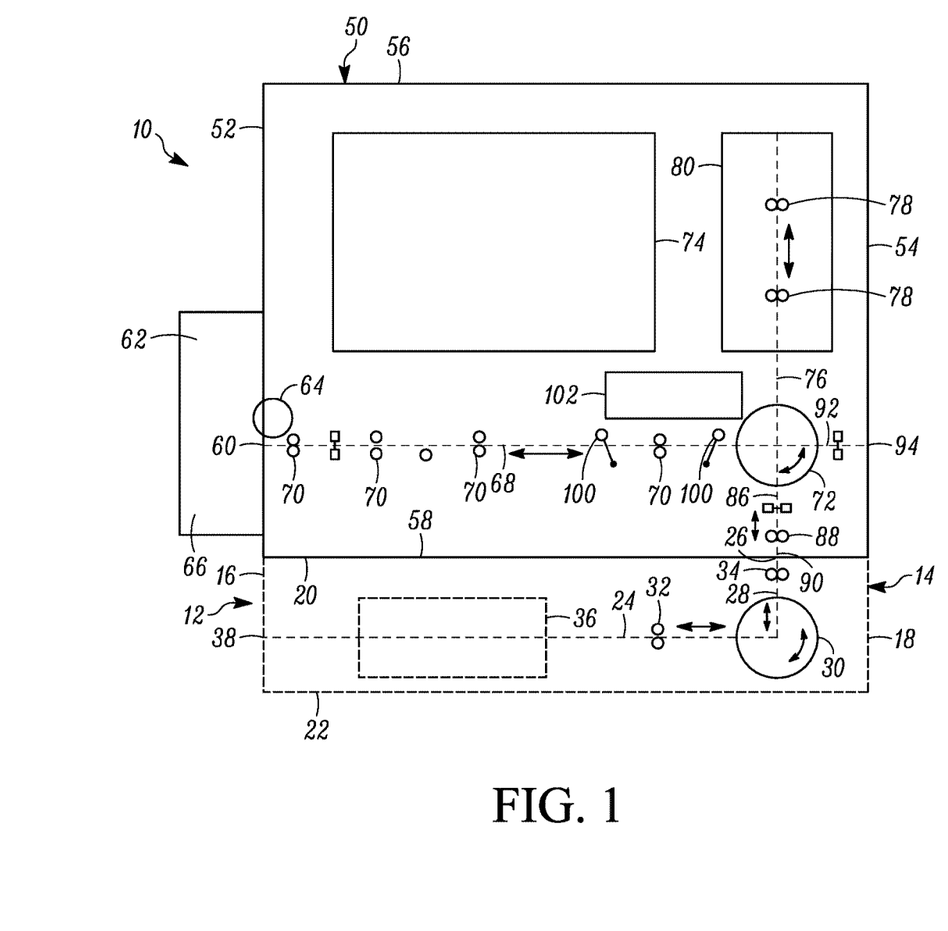
FIG. 1 schematically illustrates a modular print engine described herein removably mounted on top of a lower module.

Referring to FIG. 1, a first embodiment of a modular print engine 10 is illustrated as being detachably and removably mounted on top of a lower module 12. Together, the modular print engine 10 and the lower module 12 form a desktop card printer that in use is configured to personalize, for example, plastic cards such as financial cards including credit and debit cards, identification cards, driver's licenses, and other personalized plastic cards. The desktop card printer is designed to have a relatively small horizontal (i.e. front to back) footprint intended to permit the desktop card printer to reside on a desktop or table and that is designed to personalize cards in relatively small volumes, for example measured in tens or low hundreds per hour.

The connection between the modular print engine 10 and the lower module 12 can be any form of non-permanent connection that permits the modular print engine 10 to be detachably mounted on top of the lower module 12 and that permits the modular print engine 10 to be non-destructively detached from the lower module 12 without destroying any portion of the modular print engine 10 or the lower module 12. An example of a suitable detachable mounting between a print engine and a lower module is the detachable mounting used in the CD800 print engine that interfaces with a lower laminator module or the CE870 print engine that interfaces with a lower embosser module, both of which are available from Entrust Datacard Corporation of Shakopee, Minn.

The lower module 12 is of conventional construction and operation and as shown in FIG. 1 generally includes a lower module housing 14 illustrated in dashed lines with a front end 16, a rear end 18 opposite the front end 16, a top 20, and a bottom 22 opposite the top 20. A main card transport path 24 is defined in the housing 14 along which a plastic card is transported generally in a horizontal direction or generally parallel to the top 20 and the bottom 22. A slot 26 is defined in the top 20 of the housing 14 through which a card can be input into the housing 14 from the modular print engine 10 and, in some embodiments, output from the housing 14 back into the modular print engine 10. A secondary card transport path 28 leads from the slot 26 to a card reorienting mechanism 30 that is disposed adjacent to the rear end 18 of the housing 14. In one embodiment, the secondary card transport path 28 can be generally vertical or perpendicular to the main card transport path 24 which can be generally horizontal.

The card reorienting mechanism 30 is rotatably disposed in the housing 14 for rotation both clockwise and counter-clockwise as indicated by the arrow on the card reorienting mechanism 30. When a card is being input into the lower module 12 from the modular print engine 10, the card reorienting mechanism 30 is configured to receive a card along the secondary card transport path 28 and rotate the card so as to direct the card along the main transport path 24. Likewise, when a card is being output from the lower module 12 back into the modular print engine 10, the card reorienting mechanism 30 can receive a card from the main transport path 24, and rotate the card so as to direct the card along the secondary card transport path 28 for transport out of the lower module 12. Examples of suitable card reorienting mechanisms are described in U.S. 2013/0220984 and U.S. Pat. No. 7,398,972 each of which is incorporated herein by reference in its entirety. A card is transported along the main card transport path 24 and the secondary card transport path 28 by suitable card transport mechanisms, such as rollers 32, 34. In some embodiments, the card transport mechanisms are reversible to allow a card to be transported in forward (i.e. during card input) and reverse (i.e. during card output back through the slot 26) directions along each card transport path 24, 28 as shown by the arrows in FIG. 1. In other embodiments where the card is to be output directly from the lower module 12 after processing in the lower module 12, the card transport mechanisms need not be reversible.

The lower module 12 includes at least one card processing mechanism 36 disposed along the main card transport path 24 that is configured to perform a processing operation on the card. In one embodiment, a single card processing mechanism 36 can be provided. In another embodiment, two or more card processing mechanisms 36 can be provided one after the other along the main card transport path 24. Examples of card processing mechanisms 36 that can be used include, but are not limited to, a card embosser or a card laminator. The lower module 12 can also include an output 38 at the end of the transport path 24 through which a card can be output from the lower module 12 after processing by the processing mechanism(s) 36. In some embodiments, the lower module 12 may also include a card de-bowing mechanism (not shown) that is used to eliminate a bow that may occur on the card as a result of processing by the processing mechanism(s) 36. An example of a suitable de-bowing mechanism that can be used is described in US 2014-0345787 the entire contents of which are incorporated herein by reference. A suitable lower module with a card embosser or a card laminator is available from Entrust Datacard Corporation of Shakopee, Minn.

In operation of the lower module 12, a card enters the lower module 12 from the modular print engine 10 through the slot 26. The card is transported along the secondary card transport path 28 and into the card reorienting mechanism 30 which is then rotated to bring the card in line with the main card transport path 24. The card is then directed along the main card transport path 24 to the card processing mechanism(s) 36 which performs the one or more processing operations on the card. In one embodiment, the card is then transported along the transport path 24 to the output 38 and output from the lower module 12, for example into a hopper that can collect multiple cards. In other embodiments, after processing by the card processing mechanism(s) 36, the card can be transported in the reverse direction along the main card transport path 24 back to the card reorienting mechanism 30 which receives the card and rotates the card to bring the card in line with the secondary card transport path 28. The card is then transported along the secondary card transport path 28 and back out of the lower module 12 through the slot 26 and back into the modular print engine 10.

With continued reference to FIG. 1, the modular print engine 10 includes a housing 50 having a front end 52, a rear end 54, a top 56 and a bottom 58. A main card input 60 is located at the front end 52 of the housing 50 through which plastic cards to be processed by the modular print engine 10 and/or by the lower module 12 (i.e. processed by the desktop card printer) are input. In some embodiments, the card input 60 can also form a card output through which processed cards can be output from the modular print engine 10. In other embodiments, a card output that is separate from the card input 60, but also located at the front end 52 like the card input 60, can be provided through which processed cards can be output from the modular print engine 10.

A card input hopper 62 can be mounted at the front end 52 of the housing 50 that is in communication with the card input 60. The card input hopper 62 is designed to hold a number of plastic cards waiting to be processed which are fed one-by-one into the housing 50 by a suitable card feed mechanism 64 known in the art. In embodiments where a card output is also located at the front end 52, a card output hopper 66 can also be mounted at the front end 52 of the housing 50 that is in communication with the card output for receiving finished processed cards. The card output hopper 66 is designed to hold a number of finished processed cards after they have been processed which are fed out of the housing through a suitable card outlet, which can coincide with or be separate from the card inlet 60, and dropped into the card output hopper 66 in a manner known in the art. In one embodiment, the card input hopper 62 and the card output hopper 66 form an integral, single unit where the input hopper 62 and the output hopper 66 are combined together into a common structure that is mountable and removable as a single unit from the housing 50. In another embodiment, the input hopper 62 (as well as the output hopper 66 or both the input hopper 62 and the output hopper 66) can be configured with a multihopper configuration where the input hopper 62 is configured to simultaneously hold different card stock (for example, Visa® and Mastercard® branded card stock; driver's license card stock from different states; identification card stock having different security levels; etc.) waiting to be personalized. Each type of card stock can be selectively input into the modular print engine from the input hopper 62 as selected by the printer controller based on the type of card to be created.

A main or first card travel path 68 extends through the housing 50 from the input 60. In the illustrated example, the card travel path 68 extends substantially horizontally through the housing 50 substantially parallel to the bottom 58. Cards are transported along the card travel path 68 by a card transport mechanism, such as sets of rollers 70. In some embodiments, the card transport mechanism can be reversible to allow the cards to be transported in forward (for example during card input or during printing) and reverse (for example, if a card is to be output from the modular print engine 10 through the front end 52 or to transport a card upstream of a printer before, during or after printing) directions along the travel path 68 as shown by the arrow in FIG. 1.

A card reorienting mechanism 72 is disposed in the housing 50 along the card travel path 68 adjacent to the rear end 54. The card reorienting mechanism 72 is rotatably disposed in the housing 50 for rotation both clockwise and counterclockwise as indicated by the arrow on the card reorienting mechanism 72. The card reorienting mechanism 72 is configured to receive a card along the card travel path 68 and rotate the card so as to direct the card in a different direction along a desired card travel path. Examples of suitable card reorienting mechanisms are described in U.S. 2013/0220984 and U.S. Pat. No. 7,398,972 each of which is incorporated herein by reference in its entirety.

A print engine 74 is disposed along the card travel path 68 that is configured to print on a card disposed on the card travel path 68. In one embodiment, the print engine 74 can be configured to perform retransfer printing as described further below with respect to FIG. 2. However, the print engine 74 can be configured to perform direct to card printing, ink jet printing, laser marking, laser engraving, and any other type of printing performed on cards.

With continued reference to FIG. 1, a second card travel path 76 can extend upwardly from the card reorienting mechanism 72. In one embodiment, the second card travel path 76 extends substantially vertically upward from the card reorienting mechanism 72. However, the second card travel path 76 is not limited to extending vertically and can instead extend upwardly at an angle to vertical. Cards are transported along the card travel path 76 by a card transport mechanism, such as sets of rollers 78. In some embodiments, the card transport mechanism can be reversible to allow the cards to be transported in forward and reverse directions along the travel path 76 as shown by the arrow in FIG. 1.

A removable option module 80 is disposed along the second card travel path 76 and above the first card travel path 68. The removable option module 80 includes at least one card processing mechanism that is configured to perform a processing operation on a plastic card. As discussed further below with respect to FIGS. 3A-D, the removable option module 80 is one of a plurality of removable option modules 80 that can be installed one at a time in the modular print engine 10 to permit changes to the functionality of the modular print engine 10. Each option module 80 is configured to be individually and separately removably installed in the housing 50 along the second card travel path 76 and above the first card travel path 68, and each option module 80 is configured to perform a different processing operation on a plastic card received thereby. One option module 80 can be removed and replaced with a different option module 80 to change the functionality of the modular print engine 10.

Figure 3A:
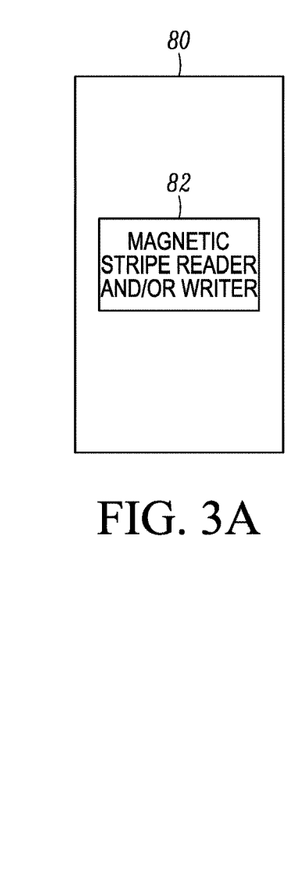
FIGS. 3A-D schematically illustrate examples of different option modules that can be installed one at a time in the modular print engine of FIG. 1.
Figure 3B:
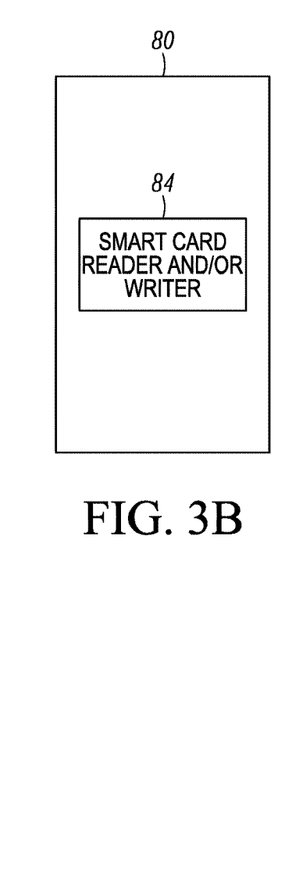
Figure 3C:
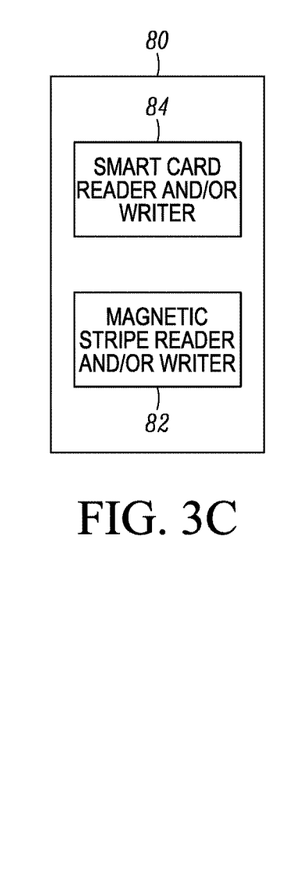
Figure 3D:
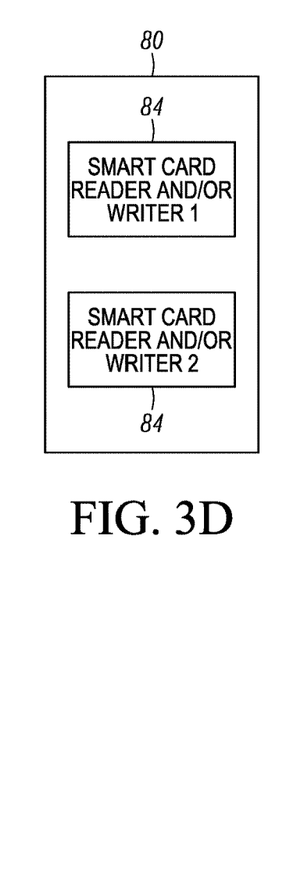

FIG. 3A illustrates that in one embodiment, the option module 80 can include a magnetic stripe reader and/or writer 82 that can read data on a magnetic stripe of a card and/or write data onto the magnetic stripe. Magnetic stripe readers and/or writers are well known in the art. FIG. 3B illustrates that in another embodiment, the option module 80 can include a smart card reader and/or writer 84 that can read data stored on an integrated circuit chip (i.e. smart card chip) on the card and/or write data to the chip. The smart card reader and/or writer 84 can be configured for contact or contactless reading and/or writing. Smart card readers and/or writers, both contact and contactless, are well known in the art. In another embodiment illustrated in FIG. 3C, the option module 80 can include both the magnetic stripe reader and/or writer 82 and the smart card reader and/or writer 84 arranged in any order. In another embodiment illustrated in FIG. 3D, the option module 80 can include two smart card readers and/or writers 84. The card processing mechanism(s) in the option modules 80 is not limited to a magnetic stripe reader and/or writer 82 and a smart card reader and/or writer 84. Other card processing mechanisms can be included in the option modules 80 in combination with or separately from the magnetic stripe reader and/or writer 82 and the smart card reader and/or writer 84. Examples of other card processing mechanisms that can be included in the option modules 80 can include, but are not limited to, a scanner that can read a one dimensional bar code on a card surface, a camera that can be used to read a one or two dimensional bar code on a card surface or capture an image of a card surface, a hole puncher that punches one or more holes in the card, and other card processing mechanisms. In one embodiment, the camera, if used, can be arranged to capture one or more images of a card surface while the card is held by the card reorienting mechanism 72.

Depending upon the desired functionality of the modular print engine 10, one can install the appropriate option module 80 in the modular print engine 10. Because each option module 80 is modular, each option module 80 can be completely tested prior to installation into the modular print engine 10 to ensure that the option module 80 is working correctly prior to installation. Further, to change functionality of the modular print engine 10, the user can replace one option module 80 with another option module 80 having the desired functionality.

Returning to FIG. 1, a third card travel path 86 can extend downwardly from the card reorienting mechanism 72. In one embodiment, the third card travel path 86 extends substantially vertically downward from the card reorienting mechanism 72 substantially in-line with the card travel path 76. However, the third card travel path 86 is not limited to extending vertically and can instead extend downwardly at an angle to vertical. Cards are transported along the card travel path 86 by a card transport mechanism, such as rollers 88. In some embodiments, the card transport mechanism can be reversible to allow the cards to be transported in forward and reverse directions along the travel path 86 as shown by the arrow in FIG. 1.

The third card travel path 86 extends to a card opening 90 in the bottom 58 of the housing 50. When the modular print engine 10 is correctly mounted on the lower module 12, the third card travel path 86 and the card opening 90 are aligned with the card transport path 28 and the slot 26 of the lower module 12 so that a card can be transferred between the modular print engine 10 and the lower module 12, i.e. transferred out of the modular print engine 10 and into the lower module 12, and in some embodiments, transferred out of the lower module 12 and back into the modular print engine 10.

In some embodiments, the modular print engine 10 can further include a fourth card travel path 92 that can extend rearwardly from the card reorienting mechanism 72 as discussed further below with respect to FIG. 5. In one embodiment, the fourth card travel path 92 can extend substantially horizontally from the card reorienting mechanism 72 in-line with the card travel path 68. However, the fourth card travel path 92 is not limited to extending horizontally and can instead extend at an angle to horizontal. When the fourth card travel path 92 is present, the travel path 92 extends to a card opening 94 formed in the rear 54 of the housing 50 to permit cards to exit and enter the card opening 94 through the rear 54 of the housing 50.

The modular print engine 10 can therefore include a card input at the front end 52 thereof and the card opening 94 through the rear 54 thereof. In some embodiments, there can also be the card opening 90 through the bottom of the modular print engine 10. In other embodiments, there can also be the card opening 202 discussed in FIG. 4.

Returning to FIG. 1, in some embodiments a card de-bowing mechanism 100 can be provided in the travel path 68 after the print engine 74. The de-bowing mechanism 100 is configured to bend the card after printing to remove a bend in the card that may develop as a result of the printing of the card, especially with retransfer printing. The de-bowing mechanism 100 can be any mechanism that is suitable for eliminating a bend that may develop in the card. An example of a suitable de-bowing mechanism 100 that can be used is described in US 2014-0345787 the entire contents of which are incorporated herein by reference.

A card reject hopper 102 is also located in the modular print engine 10, for example above the travel path 68, above the de-bowing mechanism 100, and adjacent to the card reorienting mechanism 72. The card reject hopper 102 is positioned to receive cards that one may wish to store and not output from the modular print engine 10, for example cards that are determined to be defective for some reason. For example, a card may be determined to be defective by failing to read and/or write data using the magnetic stripe reader and/or writer 82 or using the smart card reader and/or writer 84 of the option module 80. In such a case, the card is transported to the card reorienting mechanism 72 which rotates the card so that it is aligned with an input into the card reject hopper 102, and the card reorienting mechanism 72 then discharges the defective card into the card reject hopper 102 using transport rollers on the card reorienting mechanism 72. Optionally, the card reject hopper 102 can be located at any other suitable location in the modular print engine 10, and cards to be stored in the card reject hopper 102 can be transported to the card reject hopper 102 using a suitable transport mechanism.

In one exemplary operation of the modular print engine 10 of FIG. 1, a card can be initially input from the input hopper 62 through the input 60. In one embodiment, the card is initially transported along the card travel path 68 to the card reorienting mechanism 72, which redirects the card onto the second card travel path 76 where the card is transported into the option module 80. The option module 80 determines whether the magnetic stripe and/or the chip on the card are working correctly, and if they are, data is written onto the magnetic stripe and/or onto the chip. If they are not working correctly, the card can be transported back along the second card travel path 76 to the card reorienting mechanism 72 which then directs the card into the card reject hopper 102. After the data has been written, the card is transported back along the second card travel path 76 to the card reorienting mechanism 72 which then directs the card back onto the first card travel path 68. The card is then transported back toward the front end 52 upstream of the print engine 74 for printing. The card is then printed on by the print engine 74. After printing, if it is anticipated that the printing caused the card to bend, the card is transported to the de-bowing mechanism 100 which removes the bend in the card. The card is then transported to the card reorienting mechanism 72 which redirects the card to the third card travel path 86. The card is then transported out of the modular print engine 10 and into the lower module 12 through the aligned card opening 90 and the slot 26, and to the card reorienting mechanism 30 in the lower module 12. The card reorienting mechanism 30 redirects the card onto the card transport path 24 where the card is transported to the card processing mechanism(s) 36. After the card is processed in the card processing mechanism(s) 36, the card can then be output from the lower module 12 via the output 38.

In other embodiments, after the card is processed in the card processing mechanism(s) 36, the card can then be redirected back to the card reorienting mechanism 30 via the card transport path 24, and redirected out of the lower module 12 and back into the card reorienting mechanism 72 of the modular print engine 10. The card reorienting mechanism 72 can reorient the card for transport back along the card travel path 68 and into the output hopper 66. Alternatively, if the card opening 94 in the rear 54 is used, the card can be redirected by the card reorienting mechanism 72 to the fourth card travel path 92 for discharge out the card opening 94. Alternatively, as discussed further below, the card can be directed upwardly for discharge out of a card opening in the top of the modular print engine 10.

Many other operational sequences of the modular print engine 10 of FIG. 1 are possible including, but not limited to, directing the card first to the lower module 12, and then back into the modular print engine 10 for processing by the option module 80 and the print engine 74. In addition, the card can be initially printed by the print engine 74 prior to the card being directed to the option module 80 and/or to the lower module 12. In addition, the card can be initially directed into the option module 80, followed by processing in the lower module, followed by printing by the print engine 74.

As illustrated in FIG. 1, the print engine 74 is disposed above the card travel path 68. Applicant has discovered that locating the card travel path 68 below the print engine 74 improves the resulting print process by the print engine 74. For example, card handling is more reliable. For print engines that rely upon heat in the printing process, for example using one or more heated transfer rollers in the case of retransfer printing, the improved card handling is believed to result from heat rising upward in a direction away from the card during printing.

Figure 2:
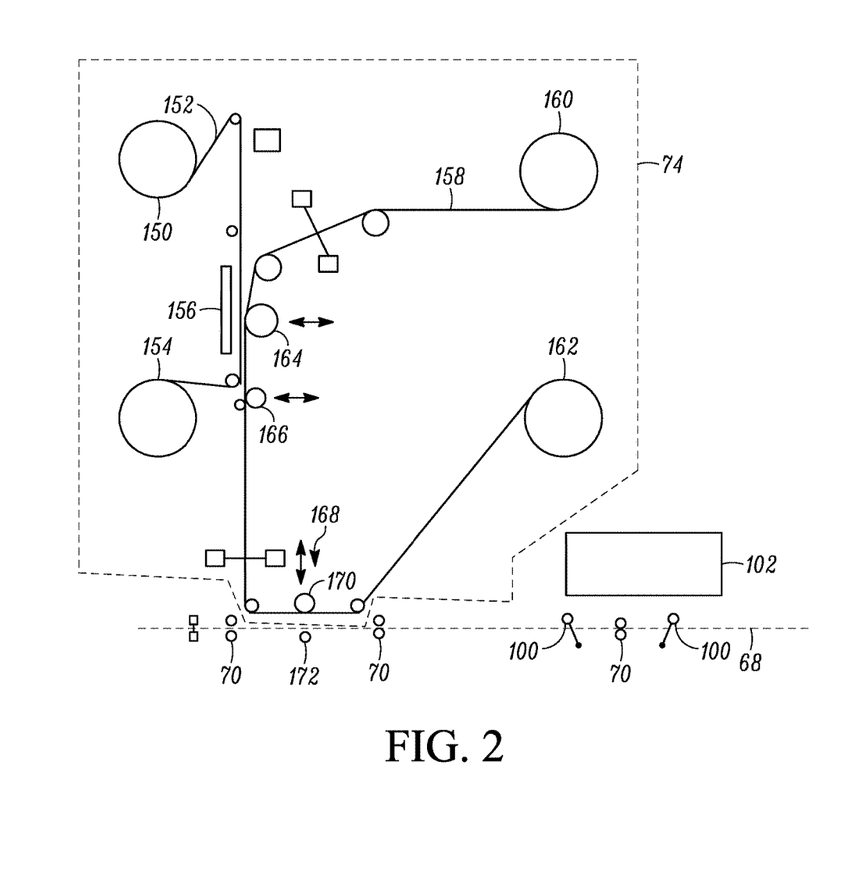
FIG. 2 schematically illustrates an example of a re-transfer print engine that can be used with the modular print engine of FIG. 1.

As described above, in one embodiment the print engine 74 can be configured to perform retransfer printing. Retransfer printing is well known in the art. FIG. 2 illustrates an example of the print engine 74 configured for retransfer printing. The illustrated retransfer printing configuration includes a print side that includes print ribbon supply 150 from which a supply of monochrome or multi-color print ribbon 152 is supplied, and a print ribbon take-up 154 that takes-up used print ribbon 152. The print ribbon is directed past a print head 156, which in the illustrated example can be stationary, which transfers dye or pigment ink from the print ribbon 152 onto a retransfer film 158. After printing, the used print ribbon 152 is then wound onto the take-up 154.

The retransfer film 158 is supplied from a film supply 160 on a retransfer side, and after retransfer the remaining film is wound onto a film take-up 162 also on the retransfer side. The retransfer film 158 is directed past a platen roller 164 positioned opposite the print head 156 and which in the illustrated example can be moved toward and away from the print head 156 to press the retransfer film 158 and the print ribbon 152 between the print head 156 and the platen roller 164 during printing onto the retransfer film 158. The retransfer side can also include a capstan roller 166 that is also movable toward and away from the print side.

Once a desired image is printed onto the retransfer film 158, the retransfer film 158 with the printed image is advanced to a transfer section 168 where the printed image on the retransfer film 158 is transferred onto a surface of the card. The transfer section 168 includes a heated transfer roller 170 that is movable toward and away from a fixed platen 172 positioned on the opposite side of the travel path 68. The heated transfer roller 170 presses the portion of the retransfer film 158 containing the printed image against the surface of the card which is backed by the platen 172, with the retransfer film 158 and the card then being transported together past the heated transfer roller 170 to transfer the layer of the retransfer film 158 containing the printed image onto the card surface. The remainder of the retransfer film 158 is then wound onto the film take-up 162.

The specific construction and operation of retransfer printers, including the print ribbon, the retransfer film, printing an image on the retransfer film, and transferring the printed image onto a surface of a card, is well known in the art. One example of retransfer printing is disclosed in U.S. Pat. No. 6,894,710 among many others. U.S. Pat. No. 6,894,710 is incorporated herein by reference in its entirety.

Figure 4:
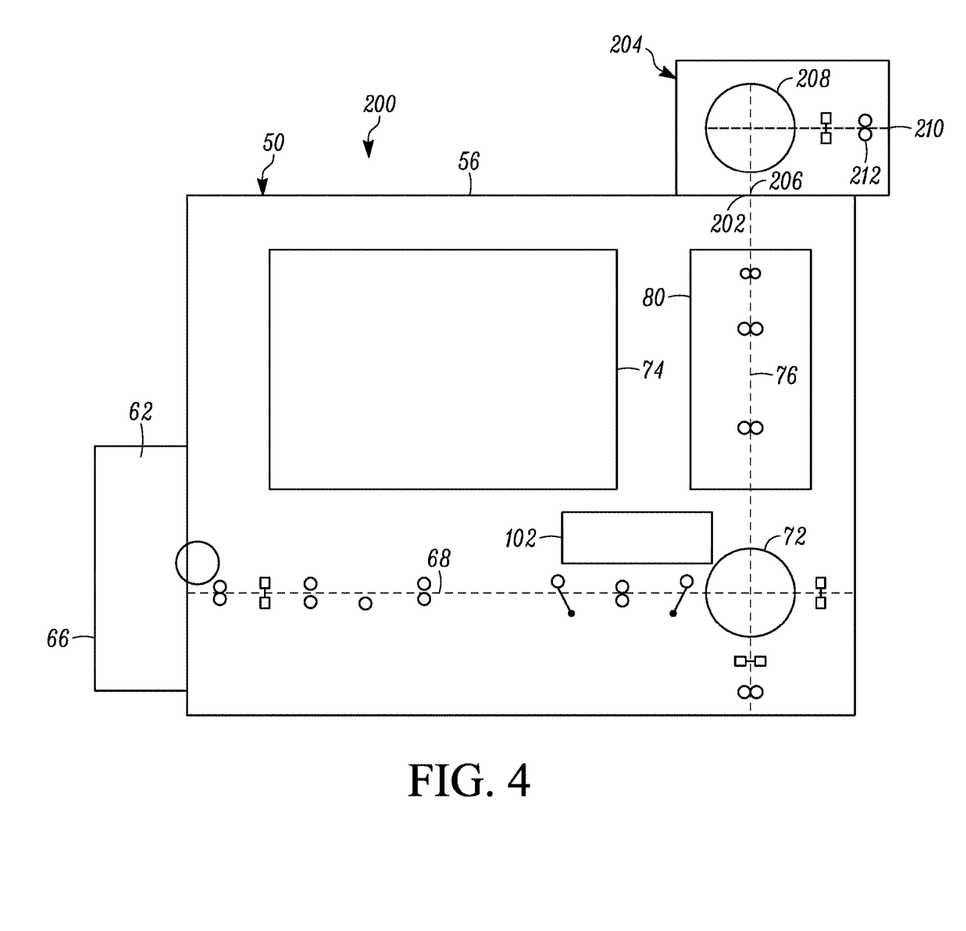
FIG. 4 schematically illustrates another embodiment of a modular print engine with an upper expansion module.

Referring now to FIG. 4, another embodiment of a modular print engine 200 is illustrated. Elements of the modular print engine 200 that are similar in construction and function to corresponding elements in the modular print engine 10 of FIG. 1 are referenced using the same reference numerals. The lower module 12 is not illustrated in FIG. 4, but the modular print engine 200 would be mounted onto a lower module, which can be similar to or different than the lower module 12 in FIG. 1.

In the embodiment in FIG. 4, the second card travel path 76 extends from the card reorienting mechanism 72 to a card opening 202 that is formed in the top 56 of the housing 50. An upper expansion module 204 is attached to the top 56 of the housing 50. The upper expansion module 204 can be selectively added to and removed from the modular print engine 200 to permit alteration in where cards are output.

The upper expansion module 204 includes an input 206 that, when the upper expansion module 204 is correctly mounted on the housing 50, is aligned with the card opening 202 for receiving a card therein. The upper expansion module 204 further includes a rotatable card reorienting mechanism 208 and an output 210 through which a card can be output from the modular print engine in a rearward direction. A card that enters the upper expansion module 204 is received in the card reorienting mechanism 208, which redirects the card approximately 90 degrees and outputs the card through the output 210 aided if necessary by transport rollers 212. The output 210, or a separate output, could be formed at the front of the upper expansion module 204 to allow front discharge of cards separately from or in addition to outputting cards to the rear through the output 210. If the upper expansion module 204 is not used, cards can still be output at the top 56 of the modular print engine 200 through the card opening 202, or the card opening 202 can be closed to prevent card travel therethrough.

Alternatively, instead of outputting cards from the upper expansion module 204, the cards can be output from the lower module 12 or through the card opening 94 as discussed above in FIG. 1. Or a user may select to output one or more cards from the upper expansion module 204, while selecting to output other cards from other locations of the desktop card printer. In this manner, the upper expansion module 204 expands the functionality of the modular print engine 200 by allowing a user to configure and select how cards are output from the modular print engine 200.

Figure 5:
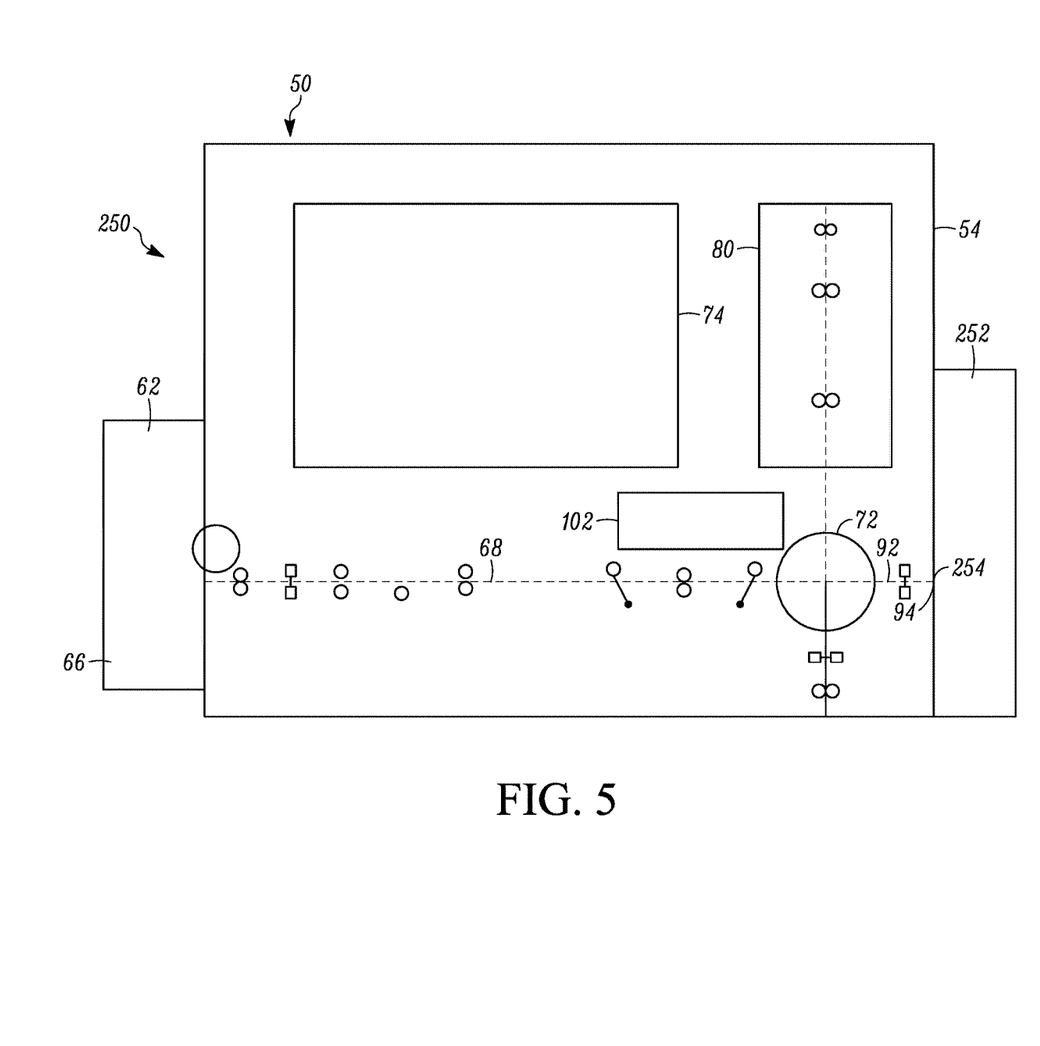
FIG. 5 schematically illustrates another embodiment of a modular print engine with a second option, or rear expansion, module.

Referring now to FIG. 5, another embodiment of a modular print engine 250 is illustrated. Elements of the modular print engine 250 that are similar in construction and function to corresponding elements in the modular print engine 10 of FIG. 1 are referenced using the same reference numerals. The lower module 12 is not illustrated in FIG. 5, but the modular print engine 250 would be mounted onto a lower module, which can be similar to or different than the lower module 12 in FIG. 1.

In the embodiment in FIG. 5, the fourth card travel path 92 is present that extends substantially horizontally from the card reorienting mechanism 72 to the card opening 94 formed in the rear 54 of the housing 50. A second option, or rear expansion, module 252 is removably attached to the rear end 54 of the housing 50 that permits a user to change the functionality of the modular print engine 250. The second option module 252 includes at least one processing mechanism that is configured to perform a processing operation on, for example, a plastic card. The removable second option module 252 is one of a plurality of different removable second option modules 252. Each second option module 252 is configured to be individually and separately removably installed on the rear 54 of the housing 50, and each second option module 252 is configured to perform a different processing operation on a plastic card received thereby. One second option module 252 can be removed and replaced with a different second option module 252 to change the functionality of the modular print engine 250.

In general, each second option module 252 includes a card opening 254 that, when the second option module 252 is correctly mounted on the housing 50, is aligned with the card opening 94 for receiving a card therein. In addition, each second option module 252 includes a housing 255 (seen in FIGS. 6A-C) that houses at least one processing mechanism that is configured to perform a processing operation, for example a personalization operation, on a plastic card.

Figure 6A:
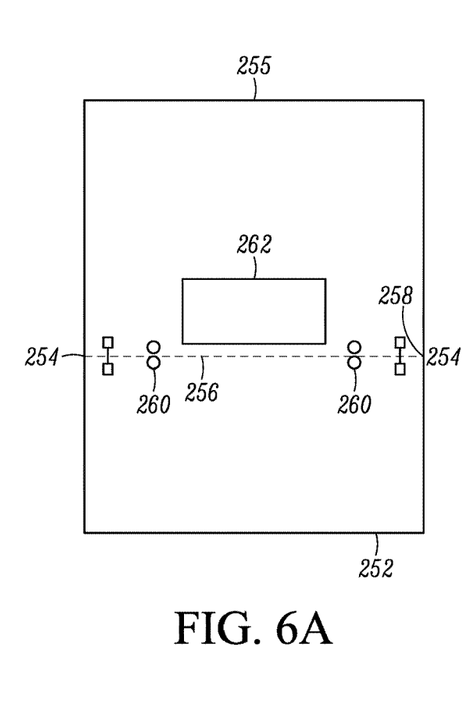
FIGS. 6A-C schematically illustrates examples of different second option modules that can be used with the modular print engine of FIG. 5.
Figure 6B:
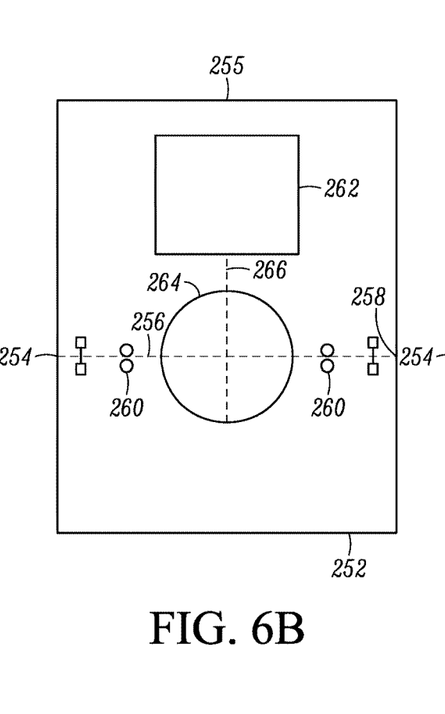
Figure 6C:
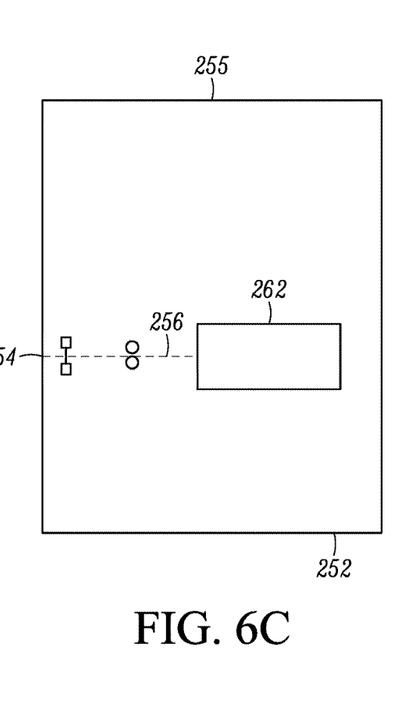

FIGS. 6A-6C illustrate different examples of the second option modules 252. Many other examples of second option modules 252 are possible including any combinations of the concepts illustrated in FIGS. 6A-C.

In FIG. 6A, the second option module 252 includes a card travel path 256 that extends from the card opening 254 substantially in-line with the travel paths 68 and 92. The travel path 256 can extend to an output 258 in the rear of the housing 255 through which cards can be selectively output. Cards are transported along the travel path 256 by a suitable reversible or non-reversible transport mechanism, such as transport rollers 260. One or more card processing mechanisms 262 are provided along the travel path 256, for example above the travel path 256, for performing one or more additional processing operations on the card. The processing mechanism 262 can be, for example, a personalization mechanism such as a magnetic stripe reader and/or writer or a smart card reader and/or writer. The processing mechanism 262 can be any one or more mechanisms that perform one or more processing operations, such as personalization or non-personalization operations, on a card. After the processing mechanism 262 finishes processing the card, the card can be output through the output 258 or transported back into the modular print engine 250.

FIG. 6B illustrates the second option module 252 as being similar to the second option module 252 of FIG. 6A, but including a card reorienting mechanism 264 that can reorient a card onto a new travel path 266 up to the card processing mechanism 262. After processing by the processing mechanism 262, the card can be directed back to the card reorienting mechanism 264, which then directs the card back onto the travel path 256 for output through the output 258 or transport back into the modular print engine 250.

FIG. 6C illustrates the second option module 252 as including the travel path 256 but no output 258. Instead, the travel path 256 ends at the processing mechanism 262. In FIG. 6C, after processing by the processing mechanism 262, the card is transported back into the modular print engine 250.

Figure 7:
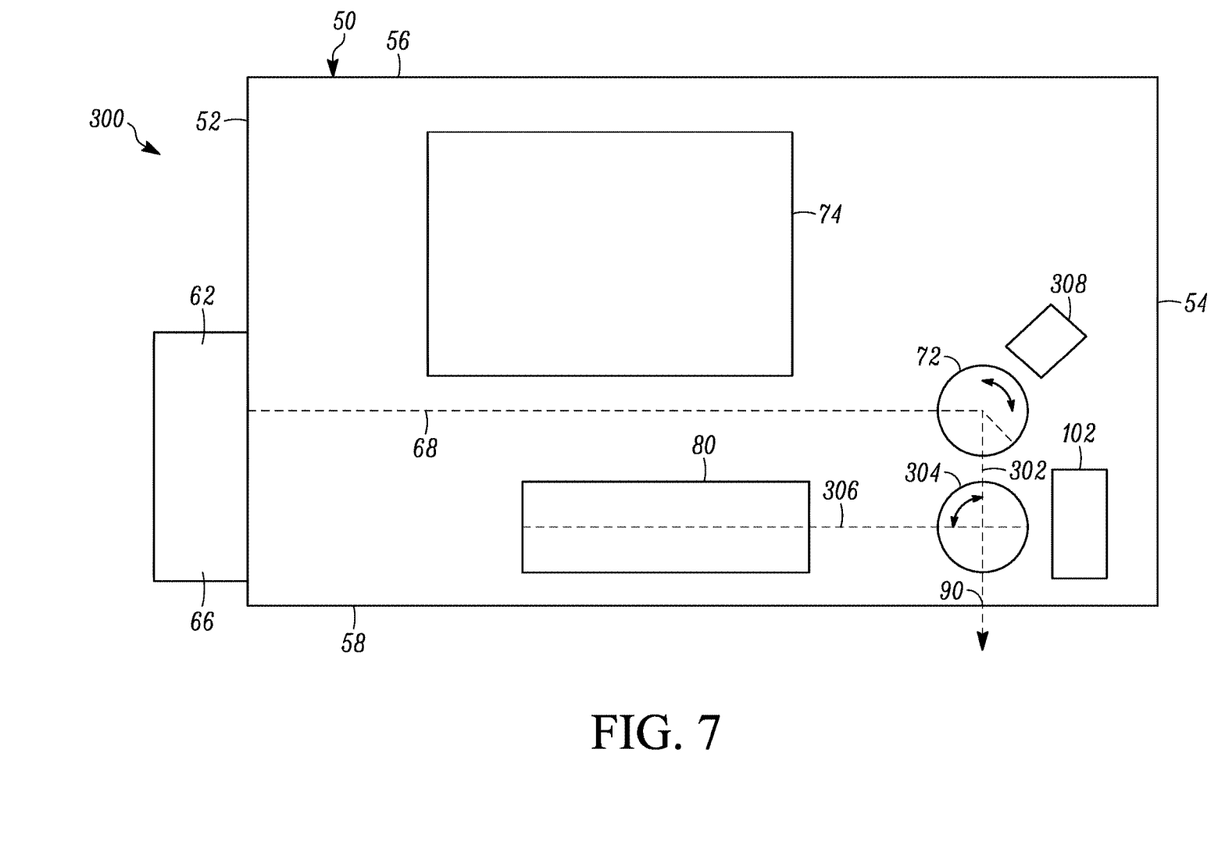
FIG. 7 schematically illustrates another embodiment of a modular print engine with an option module located below the print engine.

Referring now to FIG. 7, another embodiment of a modular print engine 300 is illustrated. Elements of the modular print engine 300 that are similar in construction and function to corresponding elements in the modular print engine 10 of FIG. 1 are referenced using the same reference numerals. For sake of simplicity, the lower module 12 is not illustrated in FIG. 7, but the modular print engine 300 would be mounted onto a lower module, which can be similar to or different than the lower module 12 in FIG. 1. In addition, the transport mechanism, such as the rollers 70, and the card de-bowing mechanism 100 are not illustrated in FIG. 7 for sake of simplicity, although a transport mechanism would be included for transporting a card along the various card travel paths described below, and the card de-bowing mechanism 100 can optionally be included.

In the embodiment illustrated in FIG. 7, the removable option module 80 is physically located below the print engine 74. A card travels along the card travel path 68 to the card reorienting mechanism 72 which can reorient the card downward along another card travel path 302 that extends to the card opening 90 in the bottom 58 of the housing 50 that communicates with the lower module 12 (not illustrated in FIG. 7). A second card reorienting mechanism 304 is located along the card travel path 302 that can redirect the card onto a card travel path 306 along which the removable option module 80 is disposed. The option module 80 can be removable and replaceable with another, differently configured option module 80 as discussed above for FIGS. 1 and 3A-D. The option module 80 in FIG. 7 can have the same configuration and operation as the option modules 80 described above with respect to FIGS. 1 and 3A-D. The card travel path 306 is illustrated as being parallel to the card travel path 68, although the card travel path 306 can extend at an angle to the card travel path 68.

In addition, the card reject hopper 102 can be located in the same position as shown in FIGS. 1, 4, and 5. Alternatively, as shown in FIG. 7, the card reject hopper 102 can be located between the second card reorienting mechanism 304 and the rear end 54 of the housing 50. Cards to be rejected can be directed into the card reject hopper 102 by the second card reorienting mechanism 304, by the first card reorienting mechanism 72, or by both of the card reorienting mechanisms 72, 304.

The modular print engine 300 can also include a card imaging device 308 that is separate from the option module 80 and adjacent to the card reorienting mechanism 72. The imaging device 308 can be, for example, a scanner that can read a one dimensional bar code on a card surface or a camera that can be used to read a one or two dimensional bar code on a card surface or capture an image of a card surface. In one embodiment, the camera can be arranged to capture one or more images of a card surface while the card is held by the card reorienting mechanism 72.

Although not illustrated in FIG. 7, the modular print engine 300 can also include the card opening 94 in the rear end 54 thereof that leads to one of the second option modules 252 described above with respect to FIGS. 5 and 6A-C and/or can include the card opening 202 in the top 56 that leads to the upper expansion module 204 described above with respect to FIG. 4.

Figure 8:
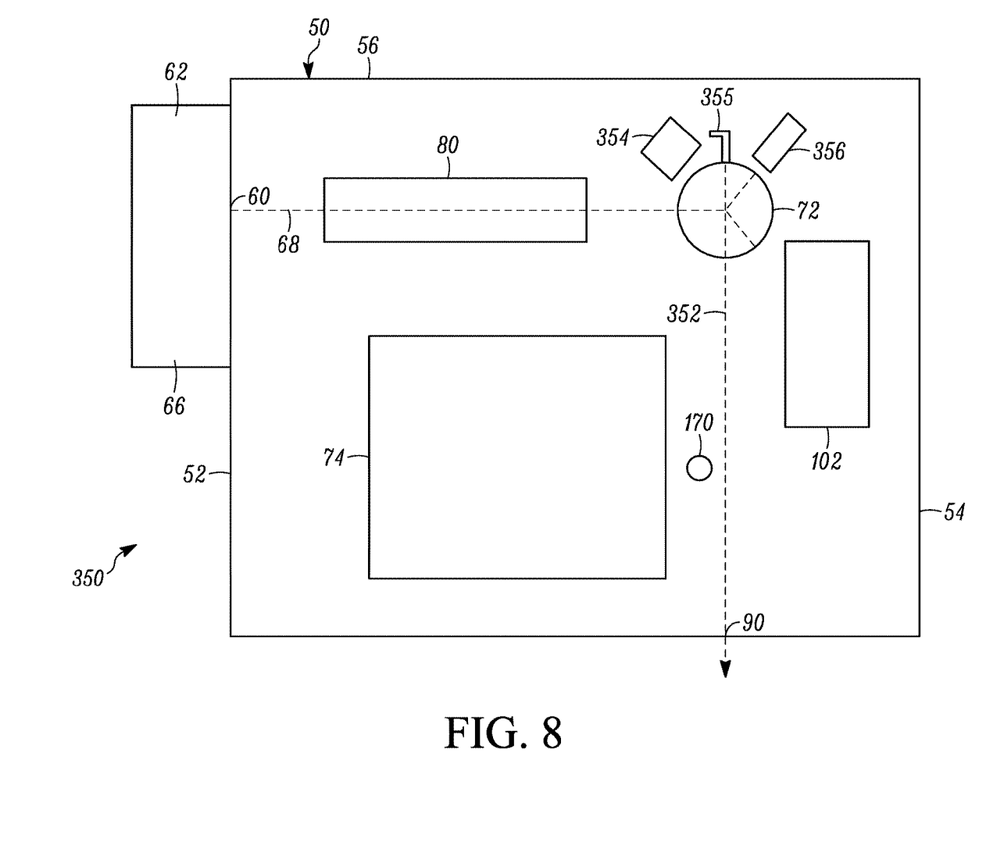
FIG. 8 schematically illustrates another embodiment of a modular print engine with a removable option module located between the input and the card reorienting mechanism.

Referring now to FIG. 8, another embodiment of a modular print engine 350 is illustrated. Elements of the modular print engine 350 that are similar in construction and function to corresponding elements in the modular print engine 10 of FIG. 1 are referenced using the same reference numerals. For sake of simplicity, the lower module 12 is not illustrated in FIG. 8, but the modular print engine 350 would be mounted onto a lower module, which can be similar to or different than the lower module 12 in FIG. 1. In addition, the transport mechanism, such as the rollers 70, and the card de-bowing mechanism 100 are not illustrated in FIG. 8 for sake of simplicity, although a transport mechanism would be included for transporting a card along the various card travel paths described below, and the card de-bowing mechanism 100 can optionally be included.

In the embodiment illustrated in FIG. 8, the removable option module 80 is physically located along the card travel path 68 between the input 60 and the card reorienting mechanism 72. In addition, the print engine 74 is positioned along a card travel path 352 that extends downwardly from the card reorienting mechanism 72 to the card opening 90 in the bottom 58 of the housing 50 that communicates with the lower module 12 (not illustrated in FIG. 8). The print engine 74 can be oriented in a direction so that printing on the card occurs along the card travel path 352. However, the print engine 74 can be located along other card travel paths extending from the card reorienting mechanism 72 so that printing occurs along any other card travel path. In the case of the print engine 74 being configured for retransfer printing, the heated transfer roller 170 would be located adjacent to the card travel path 352 as illustrated. A card travels along the card travel path 68 to or through the option module 80 and then to the card reorienting mechanism 72 which can reorient the card and direct the card downward along the card travel path 352. The option module 80 can be removable and replaceable with another, differently configured option module 80 as discussed above for FIGS. 1 and 3A-D. The card travel path 352 is illustrated as being perpendicular to the card travel path 68, although the card travel path 352 can extend at an angle to the card travel path 68.

In addition, the card reject hopper 102 can be located in the same position as shown in FIGS. 1, 4, and 5. Alternatively, as shown in FIG. 8, the card reject hopper 102 can be located adjacent to the card reorienting mechanism 72 between the card travel path 352 and the rear end 54 of the housing 50. Cards to be rejected can be directed into the card reject hopper 102 by the card reorienting mechanism 72.

In one embodiment, the modular print engine 350 can also include a card imaging device 354 that is separate from the option module 80 and adjacent to the card reorienting mechanism 72. The imaging device 354 can be, for example, a scanner that can read a one dimensional bar code on a card surface or a camera that can be used to read a one or two dimensional bar code on a card surface or capture an image of a card surface. In one embodiment, the camera can be arranged to capture one or more images of a card surface while the card is held by the card reorienting mechanism 72. In another embodiment, the card can be output from the card reorienting mechanism 72 onto a platform structure 355 that holds the card while being imaged by the imaging device 354.

In another embodiment, the modular print engine 350 can also include a smart card reader and/or writer 356 that is separate from the option module 80 and is located adjacent to the card reorienting mechanism 72 so that the card reorienting mechanism 72 can reorient and direct a card into the smart card reader and/or writer 356 for reading and/or writing on an integrated circuit chip (i.e. smart card chip) on the card. Like the option module 80, the smart card reader and/or writer 356 can also be removable and replaceable with a mechanism having different functionality. For example, a contact type smart card reader and/or writer 356 can be replaced with a contactless type smart card reader and/or writer 356, or the smart card reader and/or writer 356 can be replaced with a magnetic stripe reader and/or writer or other card processing mechanism.

Although not illustrated in FIG. 8, the modular print engine 350 can also include the card opening 94 in the rear end 54 thereof that leads to one of the second option modules 252 described above with respect to FIGS. 5 and 6A-C and/or can include the card opening 202 in the top 56 that leads to the upper expansion module 204 described above with respect to FIG. 4.

All of the individual features and elements in the embodiments in FIGS. 1-8 can be used separately from one another or in any combinations together.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A modular print engine useable in a desktop personalized plastic card printer, comprising:
a housing having a front side, a rear side, a top and a bottom;
a card input at the front side of the housing;
a card input hopper mounted at the front side of the housing that is in communication with the card input, the card input hopper is configured to hold a plurality of cards to be processed;
a card reorienting mechanism in the housing adjacent to the rear side, the card reorienting mechanism is configured to receive a card that has been input from the card input hopper and rotate the card to redirect the card along a desired card travel path;
a first card travel path between the card input and the card reorienting mechanism;
a second card travel path extending from the card reorienting mechanism, the second card travel path is not parallel to the first card travel path;
a print engine disposed along either the first card travel path or the second card travel path, the print engine is configured to print on the card; and
a removable option module disposed along either the first card travel path or the second card travel path, the removable option module includes at least one processing mechanism that is configured to perform a processing operation on the card.

2. The modular print engine of claim 1, wherein the print engine is disposed along the first card travel path and the first card travel path is below the print engine.

3. The modular print engine of claim 1, wherein the print engine comprises a retransfer print engine that is configured to perform retransfer printing.

4. The modular print engine of claim 1, further comprising a first card opening in the bottom of the housing and a third card travel path extending from the card reorienting mechanism to the first card opening.

5. The modular print engine of claim 4, further comprising a second card opening in the rear side of the housing, and a fourth card travel path extending from the card reorienting mechanism to the second card opening.

6. The modular print engine of claim 5, further comprising a second option module attached to the rear side of the housing and including an input in communication with the second card opening for receiving a card from the second card opening, and the second option module includes at least one processing mechanism that is configured to perform a processing operation on a card.

7. The modular print engine of claim 4, further comprising a second card opening in the top of the housing and the second card travel path extending from the card reorienting mechanism to the second card opening.

8. The modular print engine of claim 7, further comprising an expansion module attached to the top of the housing and including an input in communication with the second card opening for receiving a card from the second card opening, the expansion module includes an output through which a card can be output from the modular print engine.

9. The modular print engine of claim 8, wherein the expansion module includes a card reorienting mechanism.

10. The modular print engine of claim 1, wherein the second card travel path extends above the first card travel path.

11. The modular print engine of claim 1, wherein the at least one processing mechanism of the removable option module comprises:
a magnetic stripe reader and/or writer configured to read and/or write to a magnetic stripe of the card; and/or
a chip reader and/or writer configured to read and/or write to a chip of the card.

12. A modular print engine useable in a desktop personalized plastic card printer, comprising:

a housing having a front side, a rear side, a top and a bottom;

a card input at the front side of the housing;

a card input hopper mounted at the front side of the housing that is in communication with the card input, the card input hopper is configured to hold a plurality of cards to be processed;

a card reorienting mechanism in the housing adjacent to the rear side, the card reorienting mechanism is configured to receive a card that has been input from the card input hopper and rotate the card to redirect the card along a desired card travel path;

a first card travel path between the card input and the card reorienting mechanism;

a second card travel path extending from the card reorienting mechanism;

a print engine disposed along either the first card travel path or the second card travel path, the print engine is configured to print on the card; and a removable option module disposed along either the first card travel path or the second card travel path, the removable option module includes at least one processing mechanism that is configured to perform a processing operation on the card;

wherein the at least one processing mechanism of the removable option module comprises a camera that is configured to capture an image of the card while the card is located in the card reorienting mechanism.

13. A modular print engine useable in a desktop personalized plastic card printer that personalizes plastic cards, comprising:

a housing having a front side, a rear side, a top and a bottom;

a card input formed in the front side of the housing;

a card input hopper mounted at the front side of the housing that is in communication with the card input, the card input hopper is configured to hold a plurality of cards to be processed;

a first card opening formed in the bottom of the housing through which a card can travel; and a second card opening formed in the top or rear side of the housing through which a card can travel.

14. The modular print engine of claim 13, wherein the second card opening is formed in the top of the housing, and further comprising a third card opening formed in the rear side of the housing through which a card can travel.

15. A modular print engine useable in a desktop personalized plastic card printer, comprising:

a housing having a front side, a rear side, a top and a bottom;

a card input at the front side of the housing;

a card input hopper that is in communication with the card input;

a single card reorienting mechanism within the housing adjacent to the rear side, the single card reorienting mechanism is configured to receive a card and rotate the card to redirect the card along a desired card travel path;

a first card travel path within the housing and that extends from the card input to the single card reorienting mechanism, the first card travel path is parallel to the bottom of the housing;

a second card travel path within the housing and that extends from the single card reorienting mechanism, the second card travel path is not parallel to the first card travel path; and a print engine within the housing and disposed along the first card travel path, the print engine is configured to print on a card and includes a print ribbon; and the first card travel path is below the print engine.

16. The modular print engine of claim 15, further comprising a card opening in the bottom of the housing through which a card can pass from the housing.

17. The modular print engine of claim 1, wherein the first card travel path is parallel to the bottom of the housing.

* * * * *